United States Patent Office 3,359,434
Patented Dec. 19, 1967

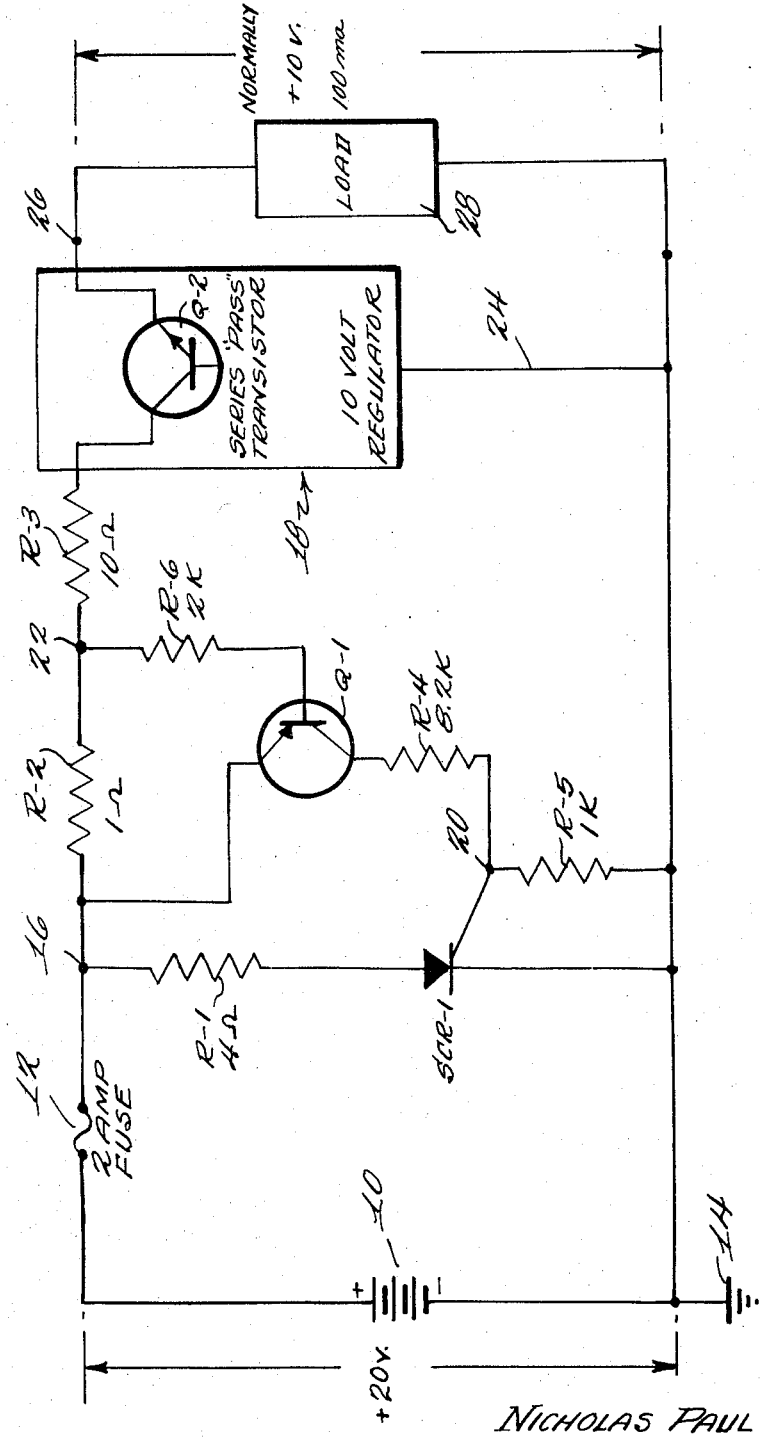

3,359,434
SILICON CONTROLLED RECTIFIER ARRANGEMENT FOR IMPROVED SHORT-CIRCUIT PROTECTION
Nicholas Paul Galluzzi, Beverly, Mass., assignor to Control Data Corporation, Minneapolis, Minn., a corporation of Minnesota
Filed Apr. 6, 1965, Ser. No. 446,009
2 Claims. (Cl. 307—88.5)

ABSTRACT OF THE DISCLOSURE

A protection means for a series voltage regulator comprising a source, a series regulating element and a load, wherein a normally non-conducting silicon controlled rectifier is connected across said source and further having means responsive to the occurrence of an overload condition to trigger said silicon controlled rectifier into conduction in response to such an overload thereby diverting said overload current from said series regulation element.

---

This invention relates to a control circuit and more particularly to a silicon controlled rectifier arrangement for improving the short-circuit protection characteristics of the circuit.

A number of circuitry designs have been utilized in the past in order to prevent the burnout of transistors in the event of a short-circuit condition within the circuit. However, these known protective arrangements have generally suffered the disadvantages of either providing slow response to the short-circuit condition or requiring extensive and costly apparatus to insure adequate response characteristics.

A principal object of the present invention is to provide a reliable, high speed protection arrangement to prevent transistor burnout when a short-circuit occurs.

Another object of the invention is to provide a simplified, inexpensive short-circuit prevention arrangement which permits a number of circuits requiring a single uninterrupted reference path to be combined.

A further object is to provide a short-circuit protection arrangement adaptable for use with various transistor circuits having a wide range of voltage ratings.

Further objects and the entire scope of the invention will become more fully apparent when considered in light of the following detailed description of an illustrative embodiment of the invention and from the appended claims.

The illustrative embodiment may best be understood by reference to the accompanying drawing which illustrates a schematic diagram of a silicon controlled rectifier arrangement for use in protecting the series pass transistor of a voltage regulator from burnout caused by a short-circuit at the regulator output.

Briefly, the invention comprises a normally "off" silicon controlled rectifier, hereinafter referred to as a SCR, which is connected across the power supply. Associated with the gate of the SCR is a transistor and voltage divider circuit which responds to a short-circuit current to turn the SCR "on" thereby diverting the current flow through the SCR to thereby protect a main transistor of the circuit.

Referring now to the drawing, the illustrated embodiment of the invention will be described. It should be noted that the embodiment illustrated is representative of a number of possible circuitry arrangements and therefore, the specific values assigned to the various components should not be considered to limit the invention to the specific circuit shown. The values for the components illustrated on the drawing are included only for the purpose of disclosing an operative embodiment. It will be appreciated that suitable variations by one skilled in the art may be made to adapt the invention to other environments.

The specific embodiment illustrated is one which serves to protect a series pass transistor of a voltage regulator from burnout when the output of the regulator experiences a short-circuit condition. The particular voltage regulator which has been illustrated is one which delivers a 10-volt output to a load which draws 100 milliamps of current.

The power source for the illustrated embodiment is a 20-volt DC source, indicated generally by numeral 10. The positive terminal of source 10 is connected through a 2-amp fuse 12 and a resistor R–1 to the anode of a silicon controlled rectifier, indicated as SCR–1. A commercially available SCR which may be utilized in the illustrative embodiment is type 2N2322. The cathode of the silicon controlled rectifier is connected to the negative terminal of power source 10. This negative terminal is joined to a reference point 14, which for convenience is designated as ground. The junction point 16 between fuse 12 and resistor R–1 is connected through series resistors R–2 and R–3 to a voltage regulator, indicated generally at 18. Junction 16 is also connected to the emitter of a PNP transistor Q–1. Again, for the purpose of illustration, this transistor may be considered as a type 2N1132. The collector of this transistor is joined through series resistors R–4 and R–5 to the reference 14. The junction point 20 between resistors R–4 and R–5 is connected to the gate of SCR–1. The base of transistor Q–1 is connected via resistor R–6 to the junction point 22 between resistors R–2 and R–3. The voltage regulator 18 is a conventional regulator having a series pass transistor associated therewith. This transistor is designated as Q–2 and is of the NPN type. Since the regulator is conventional, the details thereof need not be discussed. Consequently, the base biasing arrangement for Q–2 is not shown in detail. However, in indicating that the regulator 18 is referenced to the same point as the rest of the circuit, line 24 is illustrated as joining the regulator 18 to the reference 14. Resistor R–3 connects the junction point 22 to the collector of transistor Q–2. The emitter of Q–2 is connected to the output terminal 26. A suitable load 28 is connected between terminal 26 and the reference 14.

Now that the structure of the circuit has been disclosed, the details of its operation will be set forth. Under normal operating conditions with the voltage regulator developing a 10-volt output and 100 milliamps output current through the load 28, transistor Q–1 and the silicon controlled rectifier SCR–1 are "off." This is due to the fact that the voltage drop across resistor R–2 does not sufficiently forward-bias the emitter-base junction of Q–1 to cause it to conduct. Consequently, the gate of SCR–1 is at reference potential below its "breakover" voltage.

However, should a short-circuit be encountered at the output of regulator 18, the current through transistor Q–2 increases. The resultant increase in the voltage drop across resistor R–2, which increase is proportional to the short-circuit current, drops the potential at the base of transistor Q–1 sufficiently to begin conduction thereof. As transistor Q–1 is turned "on," its collector voltage begins to rise towards the potential of the source 10. Resistors R–4 and R–5 act as a voltage divider and the voltage applied to the gate of SCR–1 increases. The silicon controlled rectifier quickly begins conducting as soon as the "breakover" potential at its gate is reached. As SCR–1 begins to conduct, the short-circuit current is diverted therethrough. Due to the low resistance path of R–1 and SCR-1 across the source 10, the current increase causes fuse 12 to blow.

At this time, the short-circuit condition can be corrected and a new inexpensive fuse be substituted for that which was blown. As normal operation again begins, the initial surge current which occurs is slowed by the resistor R-3 to prevent the new fuse from being blown.

The operation which has just been described for a short-circuit condition is one that occurs in a very short period of time due to the employment of the easily triggered silicon controlled rectifier and the sensitive sensing circuit therefor. The response of this arrangement is so rapid that the transistor Q-2 is exposed to an increased current surge of low magnitude for only a very short period of time. Consequently, there is no large instantaneous power load on this transistor which could destroy it in a very short period.

Another important advantage of the described circuit is the fact that the sensing resistor R-2 is connected in the "high" line of the power source 10 rather than in the "low" or reference line. This permits many circuits to be combined in an electronic system which requires an uninterrupted common reference path.

As suggested previously, the circuit just described is adaptable for short-circuit protection of transistor voltage regulators of lower or higher voltage ratings than that shown. With present silicon controlled rectifiers, regulators with voltage ratings up to about 800 volts may be protected using the same general circuit configuration as shown in the illustrated embodiment.

The above described embodiment is illustrative of a preferred embodiment of the invention but is not intended to limit the possibilities of insuring a reliable, rapidly responsive short circuit protection arrangement for sensitive electrical equipment. The particular circuit disclosed herein is an example of an arrangement in which, inventive features of this disclosure may be utilized in the environment of a voltage regulator. However, it will become apparent to one skilled in the art that the inventive arrangement may be used in other environments and that certain modifications may be made within the spirit of the invention as defined by the appended claims.

What is claimed is:

1. In a circuit employing a transistor having a load connected to its output, an improved arrangement for protecting said transistor against burnout caused by a short-circuit condition in said load comprising: a power source, means connecting said power source through said transistor to said load, said connecting means including a fuse and a sensing resistor joined in series, said fuse being interposed between said sensing resistor and the power source; a silicon controlled rectifier having an anode, a cathode and a gate, means connecting said anode to the junction of the fuse and the sensing resistor and additional means joining said cathode to said power supply whereby the rectifier is connected across the power source and fuse arrangement; control means joined to the gate of said rectifier, said control means including an additional transistor having an emitter, base and a collector, said emitter and base being connected across said sensing resistor and the collector being connected to said gate whereby during normal operation said additional transistor and the silicon controlled rectifier are non-conducting; said control means being responsive to an increased voltage drop across said sensing resistor during a short-circuit condition in said load to cause said additional transistor to conduct thereby causing the silicon controlled rectifier to conduct to divert current through said rectifier.

2. In a circuit employing a transistor having a load connected to its output, an improved arrangement for protecting said transistor against burnout caused by a short-circuit condition in the load, comprising: a power source; means connecting said power source through said transistor to said load, said connecting means including a sensing resistor; a normally non-conducting silicon controlled rectifier circuit connected across said power source; and control means joining the connecting means and the silicon controlled rectifier, said control means including an additional transistor normally biased to be non-conducting, the additional transistor being responsive to an increased voltage drop across said sensing resistor, resulting from a short-circuit condition in the load, to begin conduction to cause said silicon controlled rectifier to conduct thereby diverting current through the rectifier.

References Cited

UNITED STATES PATENTS

| | | | |
|---|---|---|---|
| 3,109,980 | 11/1963 | Wiley | 307—88.5 X |
| 3,215,896 | 11/1965 | Shattuck et al. | 317—16 |
| 3,218,542 | 11/1965 | Taylor | 307—88.5 X |
| 3,253,189 | 5/1966 | Wouk | 317—16 |
| 3,258,603 | 6/1966 | Wright et al. | 307—88.5 X |

ARTHUR GAUSS, *Primary Examiner.*

DAVID J. GALVIN, *Examiner.*

J. A. JORDAN, *Assistant Examiner.*